(No Model.)
J. STONEHAM.
HORSE DETACHER.
No. 426,876. Patented Apr. 29, 1890.
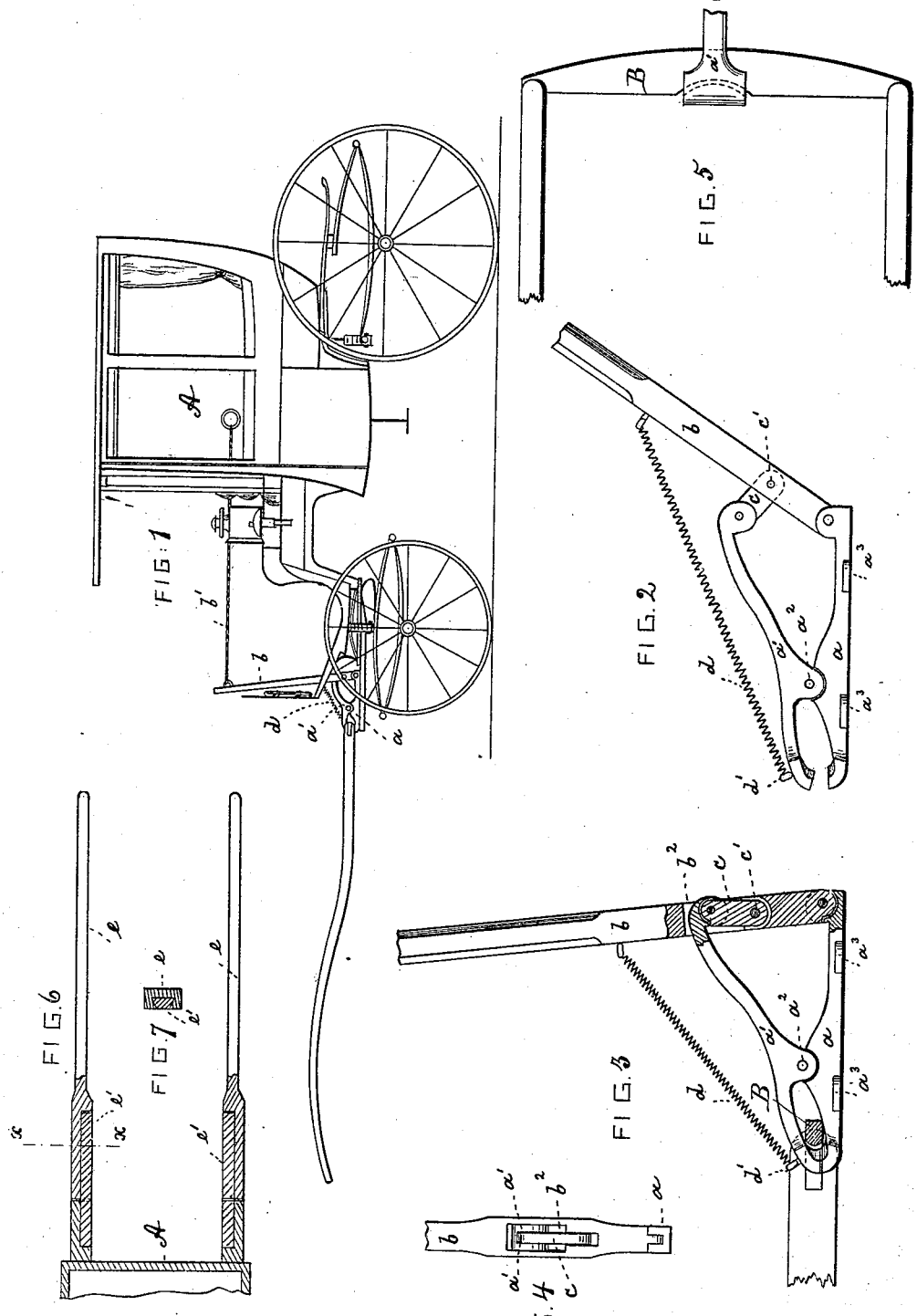
WITNESSES
Wm. A. Lowe
Wm. Wagner
INVENTOR
J. Stoneham
by his attorneys
Roeder & Briesen

UNITED STATES PATENT OFFICE.

JOHN STONEHAM, OF NEW YORK, N. Y.

HORSE-DETACHER.

SPECIFICATION forming part of Letters Patent No. 426,876, dated April 29, 1890.

Application filed March 20, 1890. Serial No. 344,646. (No model.)

*To all whom it may concern:*

Be it known that I, JOHN STONEHAM, of New York city, New York, have invented an Improved Horse-Detacher, of which the following is a specification.

This invention relates to a horse-detacher for vehicles, which, though permitting the sudden release of the horses, cannot become spontaneously opened.

The invention consists in the various features of improvement more fully pointed out in the claims.

In the accompanying drawings, Figure 1 is an elevation of a carriage provided with my improvement. Fig. 2 is a side view of the detacher, showing it open; Fig. 3, a sectional side view thereof, showing it closed; Fig. 4, a rear view of the slotted section of lever $b$; Fig. 5, a top view of the engaging end of jaw $a'$; Fig. 6, a horizontal section through the shafts of a cart constructed with a view to be provided with my improved coupling; and Fig. 7, a cross-section on line $x$ $x$, Fig. 6.

The letters $a$ $a'$ represent the two jaws of a clamp connected by pivot $a^2$. The lower jaw $a$ is provided with lugs $a^3$, that may be screwed tightly down upon the foot-board of a carriage A.

To the rear end of jaw $a$ there is pivoted a hand-lever $b$, readily accessible to the driver. A pull-rope $b'$, secured to lever $b$, extends into the carriage within reach of the occupants. The lever $b$ is slotted a short distance above its connection with jaw $a$, as at $b^2$, and within this slot is received the rear end of the upper jaw $a'$ when the lever $b$ is in its upright position, Fig. 3. The rear end of jaw $a'$ is pivotally connected to one end of a link $c$, the other end of which is pivoted by pin $c'$ to the lever $b$, within the slot thereof. When the lever is in its upright position, this link $c$ is also in its upright position, occupying the lower part of slot $b^2$.

$d$ is a spring connected at one end to lever $b$ and at the other end by staple $d'$ to jaw $a'$. This spring holds the lever in its upright position.

When the horses are to be attached to the vehicle, the lever $b$ is swung backward against action of spring $d$. This will cause the lower end of link $c$ to be also drawn backward, and the link in turn will draw the rear end of jaw $a'$ downward to open the forward ends of jaws $a$ $a'$, Fig. 2. After the cross-bar B of the thills or the whiffletree has been introduced between the jaws the lever $b$ is swung forward to again close the same. By swinging the lever $b$ backward the horses may of course be readily detached at any time. It will be observed that it is impossible to open jaw $a'$ before swinging lever $b$ backward, because any pressure that would have a tendency to raise the forward end of the upper jaw would cause the rear end of said jaw to bear tightly upon link $c$; but this link cannot possibly turn unless the lever is vibrated.

In Figs. 6 and 7 I have shown the two shafts of a cart so constructed that the cart can only tilt to a limited extent when the horse is suddenly detached. The shafts $e$ $e$ are grooved and are slipped over shafts $e'$ $e'$, secured to the vehicle. When the horse becomes detached, it carries the shafts $e$ along, and the wagon tilts until it is arrested by the ends of shafts $e'$ striking the ground.

What I claim is—

1. The combination of jaws $a$ $a'$ with a slotted hand-lever $b$, and with link $c$, said link being pivoted to the jaw $a'$ and to the hand-lever within the slot, substantially as specified.

2. The combination of jaws $a$ $a'$ with lever $b$, slotted at $b^2$, and with the link $c$, pivoted to the lever and to jaw $a'$, the rear end of jaw $a'$ and the link $c$ being adapted to be received by slot $b^2$, substantially as specified.

3. The combination of jaws $a$ $a'$ with lever $b$, slotted at $b^2$, and with link $c$, pivoted to the lever within said slot and to jaw $a'$, and with the spring $d$, substantially as specified.

JOHN STONEHAM.

Witnesses:
F. V. BRIESEN,
A. JONGHMANS.